US012598177B2

(12) United States Patent　　(10) Patent No.:　US 12,598,177 B2

Salamon　　(45) Date of Patent:　Apr. 7, 2026

(54) THREE-DIMENSIONAL DENSITY KEY AUTHENTICATION

(71) Applicant: Dell Products, L.P., Round Rock, TX (US)

(72) Inventor: Victor Salamon, Edmonton (CA)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 18/356,377

(22) Filed: Jul. 21, 2023

(65) Prior Publication Data

US 2025/0030683 A1　　Jan. 23, 2025

(51) Int. Cl.
*H04L 9/40*　　(2022.01)
(52) U.S. Cl.
CPC ................................. *H04L 63/0853* (2013.01)
(58) Field of Classification Search
CPC ................................................... H04L 63/0853
USPC ............................................................ 726/4
See application file for complete search history.

(56) References Cited

U.S. PATENT DOCUMENTS

2023/0394131 A1* 12/2023 Wade ...................... G01S 17/89

OTHER PUBLICATIONS

Ismat Mangla, "Shimming' Is the Latest Credit Card Scam," May 10, 2018, https://www.experian.com/blogs/ask-experian/shimming-is-the-latest-credit-card-scam/.
Avi Gopani, "How to Fool Facial Recognition Systems," Aug. 4, 2021 https://analyticsindiamag.com/how-to-fool-facial-recognition-systems/.

Nathaniel Mott, "Hacking Fingerprints Is Actually Pretty Easy—and Cheap," Nov. 22, 2021 https://www.pcmag.com/news/hacking-fingerprints-is-actually-pretty-easy-and-cheap.
Lewis Day, "Fooling Fingerprint Scanners with a Resin Printer," Apr. 8, 2019 https://hackaday.com/2019/04/08/fooling-fingerprint-scanners-with-a-resin-printer/.
Jon Sharman, "Killer escapes jail by making copy of master key pictured in prison guidebook," Jan. 2017 https://www.independent.co.uk/news/world/australasia/killer-escapes-jail-master-key-daniel-luther-heiss-australia-berimah-picture-prison-booklet-life-sentence-a7535556.html.
Brunker, "Products and Solutions," SKYSCAN 1275, 2023, https://www.bruker.com/content/bruker/int/en/products-and-solutions/diffractometers-and-x-ray-microscopes/3d-x-ray-microscopes/skyscan-1275.html?sc_cid=SEMB&campaign=MCT&source=google&medium=cpc&keyword=computed%20tomography%20scan&device=c&gclid=CjwKCAiA8OmdBhAgEiwAShr40zTN15Uk_QMhmihiJih_anKap_CB2gvQRLX-HTekKJc-8v4mX_XOUxoCk9gQAvD_BWE.

(Continued)

*Primary Examiner* — Anthony D Brown
(74) *Attorney, Agent, or Firm* — Fogarty LLP

(57) ABSTRACT

Three-dimensional density key authentication employs a solid three-dimensional key, opaque to visible light, having varying three-dimensional density. A first three-dimensional reader-sensor scans the three-dimensional key and creates a first digital density map of the three-dimensional key, or/and a hash thereof. An authentication server Information Handling System (IHS), operatively coupled to the first three-dimensional reader-sensor preloads the first digital density map or hash, and maps a user, action, operation and/or the like with the three-dimensional key. A second three-dimensional reader-sensor scans the three-dimensional key, creates a second digital density map of the three-dimensional key, and/or a hash thereof, and sends the second digital density map or hash, to the authentication server IHS, for the authentication server IHS to compare the second digital density map or hash, with the first, pre-loaded, digital density map or hash, for authorizing access by the user, authorizing the action, authorizing the operation and/or the like.

15 Claims, 3 Drawing Sheets

(56) References Cited

OTHER PUBLICATIONS

Micro Photonics Inc., "What is Micro-CT? An Introduction," 2020, https://www.microphotonics.com/what-is-micro-ct-an-introduction/.
Laser Design, "Get a Complete 3D Capture of Your Part," 2023, https://www.laserdesign.com/ct-scanning.

* cited by examiner

200

210    220    230    240

300

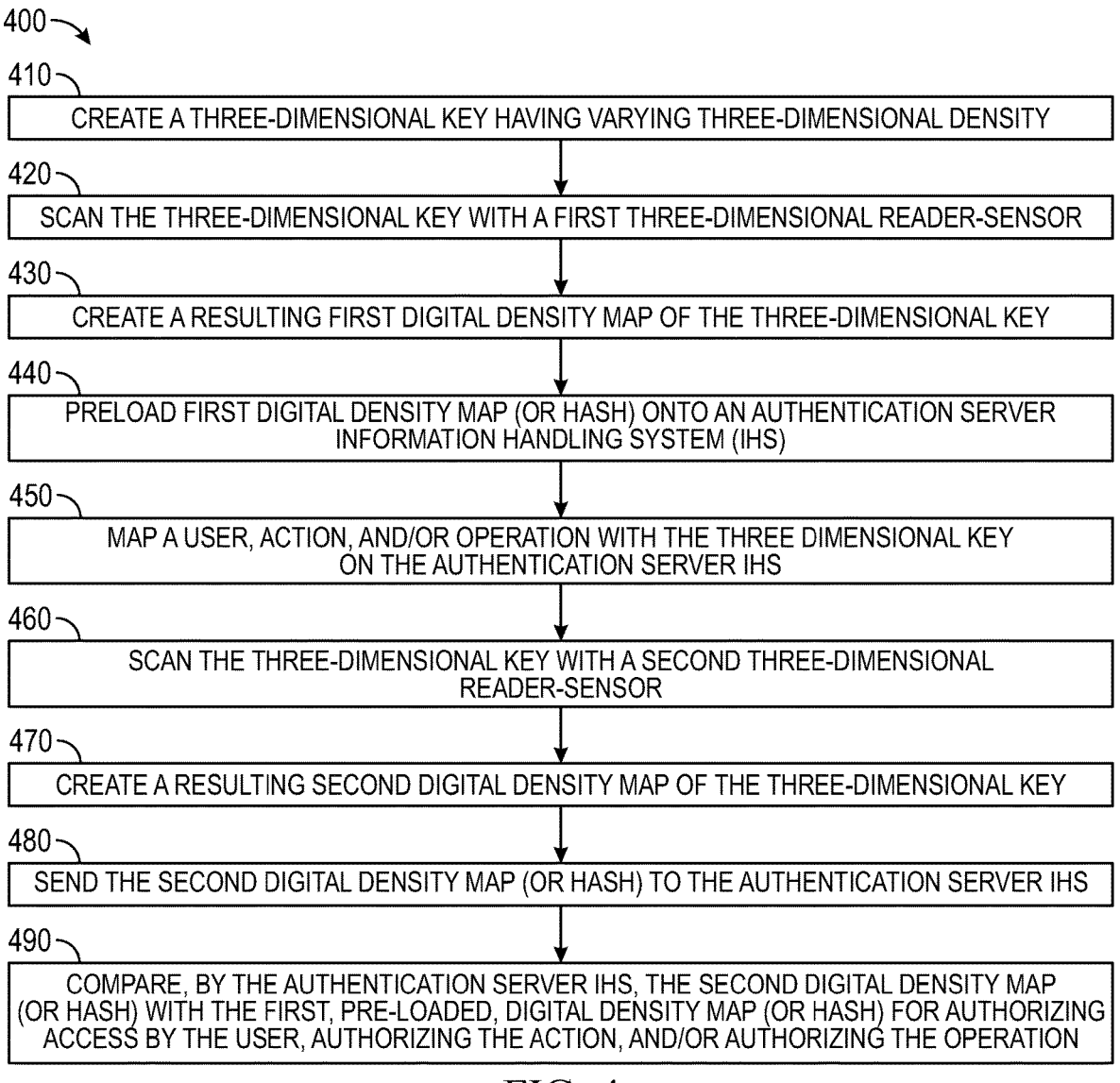

400

410
CREATE A THREE-DIMENSIONAL KEY HAVING VARYING THREE-DIMENSIONAL DENSITY

420
SCAN THE THREE-DIMENSIONAL KEY WITH A FIRST THREE-DIMENSIONAL READER-SENSOR

430
CREATE A RESULTING FIRST DIGITAL DENSITY MAP OF THE THREE-DIMENSIONAL KEY

440
PRELOAD FIRST DIGITAL DENSITY MAP (OR HASH) ONTO AN AUTHENTICATION SERVER
INFORMATION HANDLING SYSTEM (IHS)

450
MAP A USER, ACTION, AND/OR OPERATION WITH THE THREE DIMENSIONAL KEY
ON THE AUTHENTICATION SERVER IHS

460
SCAN THE THREE-DIMENSIONAL KEY WITH A SECOND THREE-DIMENSIONAL
READER-SENSOR

470
CREATE A RESULTING SECOND DIGITAL DENSITY MAP OF THE THREE-DIMENSIONAL KEY

480
SEND THE SECOND DIGITAL DENSITY MAP (OR HASH) TO THE AUTHENTICATION SERVER IHS

490
COMPARE, BY THE AUTHENTICATION SERVER IHS, THE SECOND DIGITAL DENSITY MAP
(OR HASH) WITH THE FIRST, PRE-LOADED, DIGITAL DENSITY MAP (OR HASH) FOR AUTHORIZING
ACCESS BY THE USER, AUTHORIZING THE ACTION, AND/OR AUTHORIZING THE OPERATION

FIG. 4

THREE-DIMENSIONAL DENSITY KEY AUTHENTICATION

FIELD

This disclosure relates generally to Information Handling Systems (IHSs), and, more specifically, to unique three-dimensional (3D) density key authentication.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Attackers may use state-of-the-art attack vectors to compromise IHS access authentication of high value targets, such as government officials, military, financial institution employees, or the like. Typical authentication methods combine some basic elements to work. For example, key content, such as in the form of some sort of a key, such as a public key, secret key, etc. This key is usually a number or character sequence, for example, a Secure Shell Protocol (SSH) public key, a password or passphrase, etc. Key input may include reading the key content by an input method, such as completely digital file and/or number transmission, a digital and/or analog combination, etc. Digital and/or analog combination input may be via a keyboard, Radio Frequency Identification (RFID) RFID scanner (obtains key content from a card, or the like), a camera (e.g., a picture of a face is transformed it into digital key content), a fingerprint scanner (e.g., captured fingerprint(s) are transformed into digital key content), a voice scanner (e.g., captured voice-print(s) are transformed into digital key content), etc. Another type of key input can be completely analog, such as a physical key (e.g., a physical key for a physical lock, or the like). Another basic element of typical authentication methods may be an algorithm, which processes the key content and a private key, or the like. As a result of such processing, the algorithm decides whether the authentication succeeds or fails.

Various authentication methods may use some sort of combination of these elements. For example, a completely digital solution is SSH, which uses public and/or private key authentication. In another example, a digital/analog combination solution is Point of Sales (POS) and fobs for keyless door entry, such as may use RFID as the key input. For example, an RFID sensor may receive an alphanumerical sequence as the key content. In a further example, a digital/ analog combination biometrics solution may, by way of example, be a laptop using the camera for face recognition, and/or a fingerprint scanner for fingerprint recognition.

Existing completely digital and digital/analog combination solutions described above are convenient and quick to setup. However, the convenience and speed of setup also have tradeoffs, such as ease of spoofing and/or cloning of the key content by an attacker using existing technologies. Non-biometric solutions have further security tradeoffs. Relative to analog-only solutions (e.g., a physical key), digital solutions can be shipped to users in a digital form. For example, an RFID and/or magnetic cards are trivial to clone using easily available technology. For example, hotel keys are routinely coded for each user/room combination.

Newer chip technologies in EMV (EUROPAY, MASTER-CARD, VISA) cards make it more difficult for attackers to clone the key content. However, this approach has been broken using "shimming" (using a paper-thin device, or "shim," enabled with a microchip and flash storage inserted directly into the dip-and-wait slot on card readers that accepts chip-enabled cards), and is further weakened by Personal Identification Number (PIN) spoofing, theft, etc.

Biometric solutions security tradeoffs typically include face recognition being easily fooled, such as by adding alterations or noise to an image to fool AI-driven facial recognition systems, or the like. Fingerprint recognition can be fooled with copies of fingerprints, and the like, such as by using off-the-shelf wood glue. There are also privacy concerns with respect to the use of biometrics, such that high value targets may be unlikely to use them. Further, biometrics cannot be changed, one stolen.

Existing completely analogue solutions, such as physical keys with ridge patterns, are a better resistance against cloning, albeit this resistance is not absolute. Ultimately, physical keys can also be copied, because the key pattern is visible to the naked eye. One can clone a physical key with specialized key-copy machines, or even manually, such as by making a copy of a physical key from a picture, et.

SUMMARY

Embodiments of three-dimensional (3D) density key authentication are described. In an illustrative, non-limiting example a three-dimensional key is a solid object, opaque to visible light, having varying three-dimensional density. This solid object is configured to be scanned by a three-dimensional reader-sensor to create a resulting digital density map of the three-dimensional key to be used for authentication of a user, action, and/or operation. The varying three-dimensional density may be random content, random placement of content, purposeful content, purposeful placement of content, etc. For example, the varying three-dimensional density may be one or more material density patterns within the solid object, embedded materials with different densities in the solid object, different three-dimensional objects embedded in the solid object, etc.

A three-dimensional density key authentication system employs the three-dimensional key, a first three-dimensional reader-sensor and a second three-dimensional reader-sensor. The first three-dimensional reader-sensor scans the three-dimensional key and creates a first digital density map of the three-dimensional key, or/and a hash thereof. An authentication server Information Handling System (IHS), operatively coupled to the first three-dimensional reader-sensor preloads the first digital density map or hash, and maps a user, action, operation and/or the like with the three-dimensional key. The second three-dimensional reader-sensor scans the three-dimensional key, creates a second digital density map of the three-dimensional key, and/or a hash thereof, and sends the second digital density map or hash, to the authentication server IHS, for the authentication server IHS to compare the second digital density map or hash, with the first, pre-loaded, digital density map or hash, for authorizing access by the user, authorizing the action, authorizing the operation and/or the like.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 4 is a flowchart of an example three-dimensional density key authentication setup and use process, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. A more detailed example of an IHS is described with respect to FIG. 1.

Figure 1:
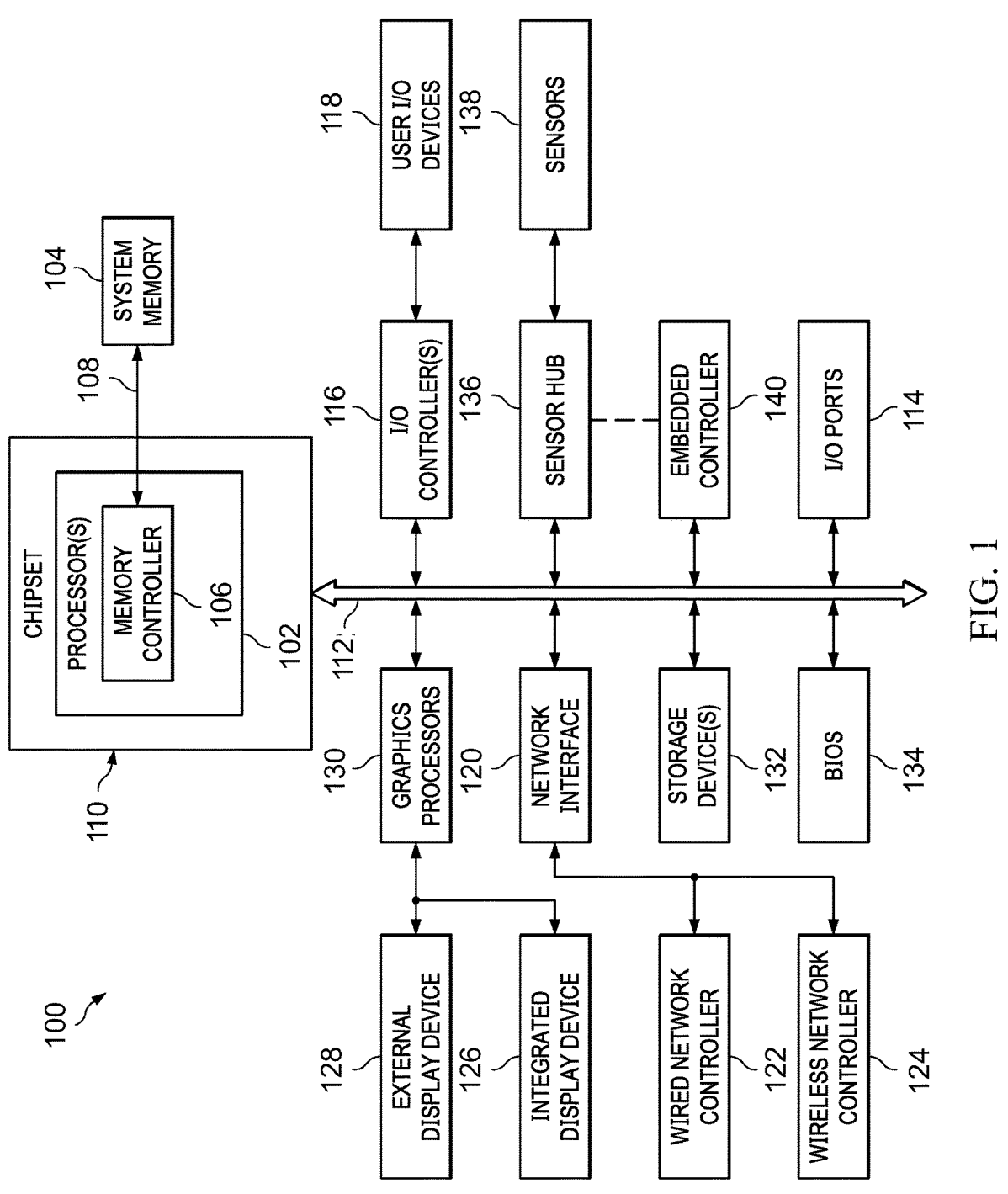
FIG. 1 is a block diagram illustrating components of an example of an Information Handling System (IHS), according to some embodiments.

FIG. 1 is a block diagram of an example of internal components of IHS 100, with which embodiments of the present three-dimensional (3D) density key authentication may be implemented, according to some embodiments. As shown, IHS 100 includes one or more processors 102, such as a Central Processing Unit (CPU), that execute code retrieved from system memory 104. Although IHS 100 is illustrated with a single processor 102, other embodiments may include two or more processors, that may each be configured identically, or to provide specialized processing operations. Processor(s) 102 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 102 includes memory controller 106 that may be implemented directly within the circuitry of processor(s) 102, or memory controller 106 may be a separate integrated circuit that is located on the same die as processor(s) 102. Memory controller 106 may be configured to manage the transfer of data to and from the system memory 104 of IHS 100 via high-speed memory interface 108. System memory 104 coupled to processor(s) 102 provides processor(s) 102 with a high-speed memory that may be used in the execution of computer program instructions by processor(s) 102. Accordingly, system memory 104 may include memory components, such as static RAM (SRAM), dynamic RAM (DRAM), NAND Flash memory, suitable for supporting high-speed memory operations by processor(s) 102. In certain embodiments, system memory 104 may combine both persistent, non-volatile memory and volatile memory. In certain embodiments, system memory 104 may include multiple removable memory modules.

IHS 100 utilizes chipset 110 that may include one or more integrated circuits that are connected to processor(s) 102. In the embodiment of FIG. 1, processor(s) 102 is depicted as a component of chipset 110. In other embodiments, all of chipset 110, or portions of chipset 110 may be implemented directly within the integrated circuitry of processor(s) 102. Chipset 110 provides processor(s) 102 with access to a variety of resources accessible via bus 112. In IHS 100, bus 112 is illustrated as a single element. Various embodiments may utilize any number of separate buses to provide the illustrated pathways served by bus 112.

In various embodiments, IHS 100 may include one or more I/O ports 114 that may support removeable couplings with various types of external devices and systems, including removeable couplings with peripheral devices that may be configured for operation by a particular user of IHS 100. For instance, I/O ports 114 may include USB (Universal Serial Bus) ports, by which a variety of external devices may be coupled to IHS 100. In addition to or instead of USB ports, I/O ports 114 may include various types of physical I/O ports that are accessible to a user via the enclosure of IHS 100.

In certain embodiments, chipset 110 may additionally utilize one or more I/O controllers 116 that may each support the operation of hardware components such as user I/O devices 118 that may include peripheral components physically coupled to I/O port 114 and/or peripheral components that are wirelessly coupled to IHS 100 via network interface 120. In various implementations, I/O controller 116 may support the operation of one or more user I/O devices 118 such as a keyboard, mouse, touchpad, touchscreen, microphone, speakers, camera and other input and output devices that may be coupled to IHS 100. User I/O devices 118 may interface with an I/O controller 116 through wired or wireless couplings supported by IHS 100. In some cases, I/O controllers 116 may support configurable operation of supported peripheral devices, such as user I/O devices 118.

As illustrated, a variety of additional resources may be coupled to processor(s) 102 of IHS 100 through chipset 110. For instance, chipset 110 may be coupled to network interface 120 that may support different types of network connectivity. IHS 100 may also include one or more Network Interface Controllers (NICs) 122 and 124, each of which may implement the hardware required for communicating via a specific networking technology, such as BLU-ETOOTH, in accordance with various embodiments of the present systems and methods, wireless local area network (e.g., Wi-Fi™), Ethernet and mobile cellular networks (e.g., CDMA, TDMA, LTE). Network interface 120 may support network connections by wired network controllers 122 and wireless network controllers 124. Each network controller 122 and 124 may be coupled via various buses to chipset 110 to support different types of network connectivity, such as the network connectivity utilized by IHS 100.

As illustrated, IHS 100 may support integrated display device 126, such as a display integrated into a terminal, laptop, tablet, 2-in-1 convertible device, or mobile device. IHS 100 may also support use of one or more external displays 128, such as external monitors that may be coupled to IHS 100 via various types of couplings, such as by connecting a cable from the external display 128 to external I/O port 128 of the IHS 100. One or more display devices 126 and/or 128 coupled to IHS 100 may utilize LCD, LED, OLED, or other display technologies. Each display device 126 and 128 may be capable of receiving touch inputs such as via a touch controller that may be an embedded component of display device 126 and/or 128 or graphics processor 130, or it may be a separate component of IHS 100 accessed via bus 112. In some cases, power to graphics processor 130, integrated display device 126 and/or external display 128 may be turned off or configured to operate at minimal power levels in response to IHS 100 entering a low-power state (e.g., standby). Chipset 110 may provide access to one or more display device(s) 126 and/or 128 via graphics processor 130. Graphics processor 130 may be included within a video card, graphics card or within an embedded controller installed within IHS 100. Additionally, or alternatively, graphics processor 130 may be integrated within processor(s) 102, such as a component of a system-on-chip (SoC). Graphics processor 130 may generate display information and provide the generated information to one or more display device(s) 126 and/or 128, coupled to IHS 100.

Chipset 110 also provides processor(s) 102 with access to one or more storage devices 132. In various embodiments, storage device 132 may be integral to IHS 100 or may be external to IHS 100. In certain embodiments, storage device 132 may be accessed via a storage controller that may be an integrated component of the storage device. Storage device 132 may be implemented using any memory technology allowing IHS 100 to store and retrieve data. For instance, storage device 132 may be a magnetic hard disk storage drive or a solid-state storage drive. In certain embodiments, storage device 132 may be a system of storage devices, such as a cloud system or enterprise data management system that is accessible via network interface 120.

As illustrated, IHS 100 also includes Basic Input/Output System (BIOS) 134 that may be stored in a non-volatile memory accessible by chipset 110 via bus 112. Upon powering or restarting IHS 100, processor(s) 102 may utilize BIOS 134 instructions to initialize and test hardware components coupled to the IHS 100. BIOS 134 instructions may also load an OS (e.g., WINDOWS, MACOS, IOS, ANDROID, LINUX, etc.) for use by IHS 100. BIOS 134 provides an abstraction layer that allows the operating system to interface with the hardware components of the IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI. IHS firmware (UEFI or BIOS), or the like, may enable a user to configure a "boot order." The IHS will try to boot from a first indicated device, and if this fails, the IHS will attempt to boot from the next indicated device, etc.

As illustrated, certain IHS 100 embodiments may utilize sensor hub 136 capable of sampling and/or collecting data from a variety of hardware sensors 138. Sensors may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). Generally, in various implementations, processor 102 may receive and/or produce context information using sensors 138 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 102, GPU 130, system memory 104, etc.), an operating temperature of components of IHS 100, such as CPU temperature, memory module temperature, etc. In certain embodiments, sensor hub 136 may be an independent microcontroller or other logic unit that is coupled to the motherboard of IHS 100. Sensor hub 136 may be a component of an integrated system-on-chip incorporated into processor 102, and it may communicate with chipset 110 via a bus connection such as an Inter-Integrated Circuit (I2C) bus or other suitable type of bus connection. Sensor hub 136 may also utilize an I2C bus for communicating with various sensors supported by IHS 100.

As illustrated, IHS 100 may utilize embedded controller (EC) 140, which may be a motherboard component of IHS 100 and may include one or more logic units. In certain embodiments, EC 140 may operate from a separate power plane from the main processors 102 and thus the OS operations of IHS 100. Firmware instructions utilized by EC 140 may be used to operate a secure execution system that may include operations for providing various core functions of IHS 100, such as power management, management of operating modes in which IHS 100 may be physically configured and support for certain integrated I/O functions. In some embodiments, EC 140 and sensor hub 136 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 102 as an SoC.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 100 of FIG. 1 is only one example of a system in which the certain embodiments may be utilized. Indeed, the embodiments described herein may be used in various electronic devices, such as network router devices, televisions, custom telecommunications equipment for special purpose use, etc. That is, certain techniques described herein are in no way limited to use with the IHS of FIG. 1.

Embodiments of the present three-dimensional density key authentication relate generally to IHSs, and, more specifically, to unique three-dimensional density key authentication. In light of the above discussion of vectors that may be used to compromise IHS access authentication, embodiments of the present three-dimensional density key authentication has clone-resistance, but with the convenience of digital solutions. To wit, in accordance with some embodiments, three-dimensional density key authentication employs a solid three-dimensional key, opaque to visible light, having varying three-dimensional density. A first three-dimensional reader-sensor scans the three-dimensional key and creates a first digital density map of the three-dimensional key, or/or a hash thereof. An authentication server Information Handling System (IHS), operatively coupled to the first three-dimensional reader-sensor preloads the first digital density map or hash, and maps a user, action, operation and/or the like with the three-dimensional key. A second three-dimensional reader-sensor scans the three-dimensional key, creates a second digital density map of the three-dimensional key, and/or a hash thereof, and sends the second digital density map or hash, to the authentication server IHS, for the authentication server IHS to compare the second digital density map or hash, with the first, pre-loaded, digital density map or hash, for authorizing access by the user, authorizing the action, authorizing the operation and/or the like.

Figure 2:
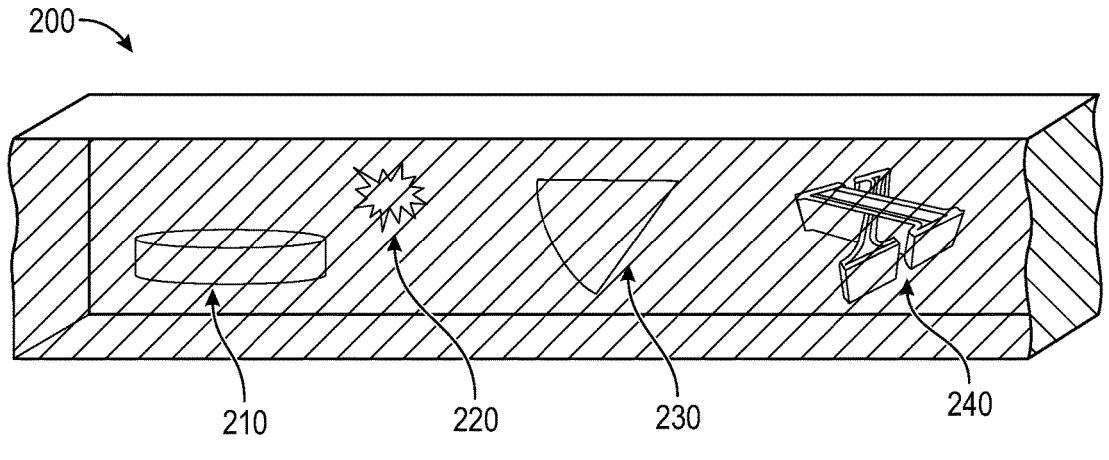
FIG. 2 is a partially fragmented, generally cross-sectional, diagrammatic illustration of a three-dimensional (3D) card with (random) three-dimensional objects of different materials embedded within, according to some embodiments.

FIG. 2 is a partially fragmented, generally cross-sectional, diagrammatic illustration of three-dimensional card 200 with random three-dimensional objects 210, 220, 230 and 240 of different materials embedded therein, according to some embodiments of the present three-dimensional density key authentication. Thereby, varying three-dimensional density of the three-dimensional key using random content and/or random placement of content. Therein, some of three-dimensional objects 210, 220, 230 and 240, or the like, may be hollow, some filled, etc. (e.g., a combination thereof). In accordance with embodiments of the present three-dimensional density key authentication card 200 is opaque, but it is illustrated in FIG. 2 as transparent for showing example contents (i.e., three-dimensional objects 210, 220, 230 and 240).

Figure 3:
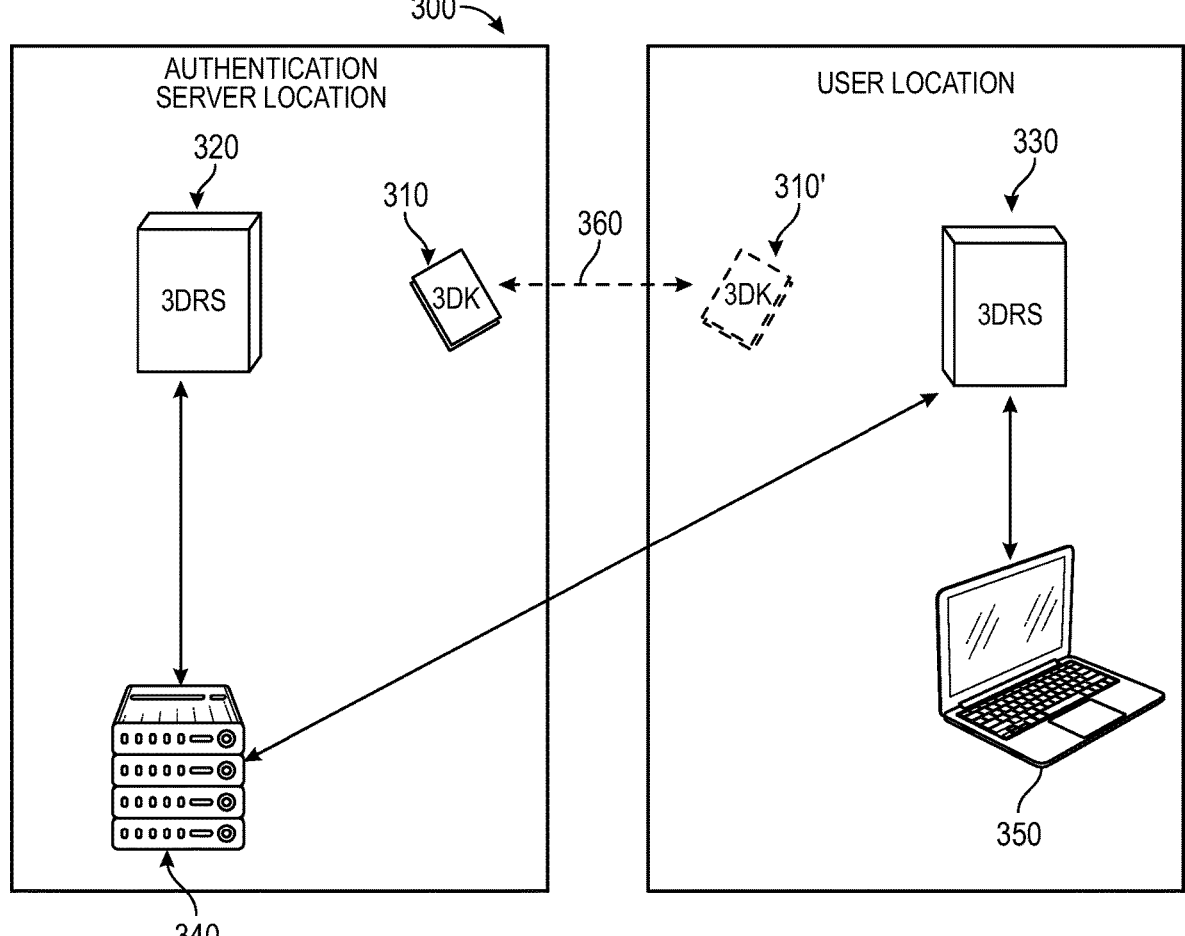
FIG. 3 is a diagrammatic illustration of an example of a three-dimensional density key authentication system, according to some embodiments.

FIG. 3 is a diagrammatic block illustration of example three-dimensional density key authentication system 300, according to some embodiments. Embodiments for three-dimensional density key authentication system 300 may make use of a number of two primary types of components, including three-dimensional key 310, which may be referred to as a "3DK," or the like, and three-dimensional reader and/or sensor devices 320 and 330, which may be referred to as "three-dimensional reader-sensors," "3DRS," or the like.

Three-dimensional key 310 may be considered more analog, than digital. Each key is a solid object (e.g., plastic, resin, metal), opaque to natural and/or visible light. The object has varying three-dimensional density. The density variation pattern is not visible through the naked eye or under a strong light. The varying three-dimensional density may be accomplished with unique hidden material density patterns. This can be obtained by purposely varying the material density while manufacturing each card, such as through purposeful content and/or placement, such as, systematically chosen unique content and placements by the manufacturer. For example, different three-dimensional objects (e.g., three-dimensional objects 210, 220, 230, 240, or the like), which may be formed by materials with different densities, can be embedded in three-dimensional key 310. For example, including metal balls or spheres, such as arranged in unique positions, in three-dimensional key 310, and/or layering different millimeter-thick copper layers, over each other, in multiple layers, defining different shapes. As such the density variations are three dimensional, through three-dimensional key 310. Thusly, a manufacturing process may purposely introduce randomness in the three dimensional positions, type and materials of the varying density objects three-dimensional objects (210, 220, 230, 240, or the like) within three-dimensional key 310.

Three-dimensional reader-sensors 320 and 330 are configures to read the resulting three-dimensional density map of three-dimensional key 310. in accordance with embodiments of the present three-dimensional density key authentication, three-dimensional reader-sensor 320 sensors may be scaled-down versions of ground-penetrating radar, Computerized Tomography (CT) scan X-Ray, and/or the like. three-dimensional scanning technology, such as three-dimensional X-ray Microscopy, Micro-CT, or the like that is smaller, mobile and/desktop-size for smaller objects, can be employed as three-dimensional reader-sensor 320, in accordance with embodiments of the present three-dimensional density key authentication.

In accordance with embodiments of the present three-dimensional density key authentication apparatus, systems and methods one or more three-dimensional keys (320) may be associated with, such as being operatively coupled to, one or more authentications server IHSs 340, such as for setup of (the) three-dimensional key(s) for three-dimensional density key authentication, such as described below, with reference to FIG. 4. A three-dimensional reader-sensor (330) is also associated with, such as being operatively coupled to, a user resource 350 (e.g., such an IHS (100)), such as for three-dimensional density key authentication of a user, such as described below, with later reference to FIG. 4.

FIG. 4 is a flowchart of example three-dimensional density key setup and authentication process 400, according to some embodiments. To setup authentication keys, three-dimensional keys (310) are created, at 410, such as in a secure manufacturing facility, and are transported to authentication server locations. At 420, the three-dimensional keys are scanned by a (first) three-dimensional reader-sensor (320), creating resulting digital density maps of the three-dimensional keys, at 430. The digital density maps, and/or their hashes, are preloaded onto authentication servers (340) at 440. Thusly, these three-dimensional keys become authenticated keys. At 450, specific users, specific actions, specific operations and/or the like are mapped with one or more of the three-dimensional keys and the resulting authenticated three-dimensional keys are distributed (360) to authorized users, such as through secure physical delivery (e.g., courier, parcel service requiring another form of authentication upon receipt, or the like).

User authentication may entail the following. At 460, a user authenticates access to a resource (300 (e.g., IHS 100)), an action, an operation, or the like, by placing their three-dimensional key (310') in proximity to a (second) three-dimensional reader-sensor (330) attached, or otherwise operatively coupled, to the resource, or otherwise configured to control the action or operation (e.g., lock and unlock a door or device). Thusly, at 460, this three-dimensional reader-sensor scans the three-dimensional key, developing (or otherwise creating or extracting) the (a second) density distribution map(s) for the scanned three-dimensional key, at 470. Thusly, at 470, the resulting density distribution map(s) is (may be also) encoded as key content. At 480, the three-dimensional reader-sensor sends the resulting encoded three-dimensional key density map(s), or a hash thereof, (i.e., the key content) to the authentication server(s) (340), such as via a network (e.g., a LAN, the internet, etc.). At 490, the authentication server compares the encoded density map(s), or the hashes thereof, (i.e., key content) with its pre-loaded database of authenticated keys (i.e., the digital density maps of the three-dimensional keys and/or their hashes preloaded onto the authentication servers) to authorize access to the respective user, for the respective action, for the respective operation, or the like.

In accordance with the foregoing, three-dimensional keys are unique, even more unique than existing physical keys and it is difficult, if not impossible to read a three-dimensional key due to the density being embedded in the three-dimensional key. To read a three-dimensional key density map, expensive and specialized three-dimensional key equipment is needed. Also, it is exceedingly difficult to clone a three-dimensional key, due to embodiments of the present three-dimensional density key authentication purposefully adding random variation into the three-dimensional key, Further, as described above, it is convenient to authenticate under embodiments of the present three-dimensional density key authentication (e.g., by placing the three-dimensional key (310) in close proximity to the three-dimensional reader-sensor (320), in a manner similar to an RFID card, or the like. Thereby, embodiments of the present three-dimensional density key authentication combine the convenience of authentication, similar to digital solutions, with higher protection against cloning, such as even better protection than physical keys, or the like.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A system comprising:
a three-dimensional key that comprises a solid object, opaque to visible light, with varied three-dimensional density;
a first three-dimensional reader-sensor configured to scan the three-dimensional key and create a first digital density map of the three-dimensional key;
an authentication server Information Handling System (IHS), operatively coupled to the first three-dimensional reader-sensor and configured to preload the first digital density map and map a user, action, and/or operation with the three-dimensional key on the authentication server IHS; and
a second three-dimensional reader-sensor configured to:
scan the three-dimensional key;
create a second digital density map of the three-dimensional key; and
send the second digital density map to the authentication server IHS, for the authentication server IHS to compare the second digital density map with the first, preloaded, digital density map to authorize access by the user, authorize the action, and/or authorize the operation.

2. The system of claim 1, wherein the varied three-dimensional density of the three-dimensional key comprises random content, random placement of content, purposeful content and/or purposeful placement of content.

3. The system of claim 1, wherein the authentication server IHS is further configured to map the user, action, and/or operation with the three-dimensional key based at least in part on the first digital density map.

4. The system of claim 1, wherein the authentication server IHS is further configured to:
create a hash of the first digital density map;
preload the first digital density map onto the authentication server IHS at least in part by preload of the hash of the first digital density map onto the authentication server IHS;
map the user, action, and/or operation with the three-dimensional key based at least in part on the hash of the first digital density map; and
compare the second digital density map with the first, preloaded, digital density map by retrieval of the hashed first digital density map and a comparison of the second digital density map with the first, preloaded, digital density map for authorization of access by the user, authorization of the action, and/or authorization of the operation.

5. The system of claim 1, wherein:
the second three-dimensional reader-sensor is further configured to create a hash of the second digital density map and to send the second digital density map of the three-dimensional key to the authentication server IHS at least in part by transmission of the hash of the second digital density map to the authentication server IHS; and
the authentication server IHS is further configured to:
create a hash of the first digital density map;
preload the first digital density map by preload of the hash of the first digital density map;
map the user, action, and/or operation with the three-dimensional key based at least in part on the hash of the first digital density map; and
compare the second digital density map with the first, preloaded, digital density map at least in part by a comparison of the hash of the second digital density map with the hash of the first, preloaded, digital density map for authorization of access by the user, authorization of the action, and/or authorization of the operation.

6. The system of claim 1, wherein the second three-dimensional reader-sensor is further configured to scan the three-dimensional key when the three-dimensional key is in proximity of the second three-dimensional reader-sensor.

7. The system of claim 1, wherein the second three-dimensional reader-sensor is operatively coupled to a resource accessed by the user, that is accessed to carry out the action, and/or that is accessed to carry out the operation.

8. A method comprising:
creating a three-dimensional key;
scanning the three-dimensional key with a first three-dimensional reader-sensor, creating a resulting first digital density map of the three-dimensional key;
preloading the first digital density map onto an authentication server Information Handling System (IHS);
mapping a user, action, and/or operation with the three-dimensional key on the authentication server IHS;
scanning the three-dimensional key with a second three-dimensional reader-sensor, creating a resulting second digital density map of the three-dimensional key;
sending the second digital density map to the authentication server IHS; and
comparing, by the authentication server IHS, the second digital density map with the first, preloaded, digital density map for authorizing access by the user, authorizing the action, and/or authorizing the operation.

9. The method of claim 8, wherein the three-dimensional key comprises a solid object, opaque to visible light having varying three-dimensional density.

10. The method of claim 9, wherein the varying three-dimensional density comprises random content, random placement of content, purposeful content and/or purposeful placement of content.

11. The method of claim 8, wherein mapping the user, action, and/or operation with the three-dimensional key on the authentication server IHS comprises mapping the user, action, and/or operation with the first digital density map.

12. The method of claim 8, further comprising creating a hash of the first digital density map, and wherein:

preloading the first digital density map onto the authentication server IHS comprises preloading the hash of the first digital density map onto the authentication server IHS;

mapping the user, action, and/or operation with the three-dimensional key comprises mapping the user, action, and/or operation with the hash of the first digital density map; and comparing the second digital density map with the first, preloaded, digital density map further comprises retrieving the hashed first digital density map and comparing the second digital density map with the first, preloaded, digital density map for authorizing access by the user, authorizing the action, and/or authorizing the operation.

13. The method of claim 8 further comprising creating a hash of the first digital density map and the second digital density map, and wherein:

preloading the first digital density map onto the authentication server IHS comprises preloading the hash of the first digital density map onto the authentication server IHS;

mapping the user, action, and/or operation with the three-dimensional key comprises mapping the user, action, and/or operation with the hash of the first digital density map;

sending the second digital density map of the three-dimensional key to the authentication server IHS comprises sending the hash of the second digital density map to the authentication server IHS; and comparing the second digital density map with the first, preloaded, digital density map further comprises comparing the hash of the second digital density map with the hash of the first, preloaded, digital density map for authorizing access by the user, authorizing the action, and/or authorizing the operation.

14. The method of claim 8, wherein:

preloading the first digital density map onto the authentication server IHS further comprises preloading the first digital density map, or a hash thereof, into a preloaded database of authenticated keys;

mapping the user, action, and/or operation with the three-dimensional key on the authentication server IHS further comprises mapping the user, action, and/or operation with the three-dimensional key, or a hash thereof, in the preloaded database of authenticated keys; and comparing the second digital density map with the first, preloaded, digital density map further comprises comparing, by the authentication server IHS, the second digital density map, or a hash thereof, with the first, preloaded, digital density map, or a hash thereof, in the preloaded database of authenticated keys for authorizing access by the user, authorizing the action, and/or authorizing the operation.

15. The method of claim 14, wherein the preloaded database of authenticated keys is a hash table of hashes of a plurality of first digital density maps, each hash of one first digital density map is mapped to one user, action, and/or operation.

* * * * *